United States Patent
Yagi

(10) Patent No.: US 6,596,946 B2
(45) Date of Patent: Jul. 22, 2003

(54) MOLDING WITH INTEGRAL FIXATION MEMBER

(75) Inventor: Sakai Yagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/098,361

(22) Filed: Mar. 18, 2002

(65) Prior Publication Data

US 2002/0092669 A1 Jul. 18, 2002

Related U.S. Application Data

(62) Division of application No. 09/148,189, filed on Sep. 4, 1998, now Pat. No. 6,383,438.

(30) Foreign Application Priority Data

Sep. 4, 1997 (JP) .............................................. 9-239907

(51) Int. Cl.⁷ .............................................. H01B 17/00
(52) U.S. Cl. ............... 174/154; 174/137 R; 174/138 G; 439/212; 439/251
(58) Field of Search ......................... 174/137 R, 138 R, 174/138 G, 138 E, 154, 155, 156, 158 R, 162, 163 R; 439/90, 109, 212, 213, 251, 575, 692

(56) References Cited

U.S. PATENT DOCUMENTS

| | | | |
|---|---|---|---|
| 4,358,633 A | 11/1982 | Reynolds, Jr. | |
| 4,833,570 A * | 5/1989 | Teratani | 174/138 G |
| 5,527,502 A | 6/1996 | Kiuchi et al. | |
| 5,714,106 A | 2/1998 | Yoda et al. | |
| 5,938,450 A * | 8/1999 | Nagafuji | 439/608 |
| 6,019,928 A | 2/2000 | Fujitani et al. | |
| 6,045,739 A | 4/2000 | Abe | |
| 6,066,006 A * | 5/2000 | Shaw | 439/212 |

FOREIGN PATENT DOCUMENTS

| | | |
|---|---|---|
| EP | 0164787 A1 * | 12/1985 |
| JP | 9-002385 | 7/1998 |

OTHER PUBLICATIONS

JP Patent Publication No. 8–303319A, dated Nov. 19, 1996, Sumitomo Wiring System, Ltd., with English language translation of the Abstract.

* cited by examiner

*Primary Examiner*—Dean A. Reichard
*Assistant Examiner*—Adolfo Nino
(74) *Attorney, Agent, or Firm*—Sughrue Mion, PLLC

(57) ABSTRACT

An insert molding having a conductor member with an end portion utilized as a contact point. A fixation member holds a portion of the conductor member. A resin portion covers the conductor member in areas other than the contact point with the fixation member formed integrally with the resin portion.

5 Claims, 3 Drawing Sheets

MOLDING WITH INTEGRAL FIXATION MEMBER

This is a divisional of application Ser. No. 09/148,189, filed Sep. 4, 1998; the disclosure of which is incorporated herein by reference.

BACKGROUND OF THE INVENTION

1. Technical Field of the Invention

The present invention relates to an insert molding, and particularly relates to an insert molding in which a portion of a conductor member other than a contact point can be coated with a thin film surely.

2. Description of the Related Art

In a terminal 30 for connecting an electric equipment of a car, a pair of bus bars 31 are insert-molded with resin having an insulating characteristic as shown in FIGS. 3(A) to 3(C).

The bus bars 31 are made into suitable metal plate members having electrical conductivity, and disposed in parallel with each other along the axial direction of identical columnar circumferential surface in the state where the respective end portions of the bus bars 31 have been trued up. These bus bars 31 are projecting outside from a coating 32 in order to make their respective one end portions act as contact points.

In manufacturing such a terminal 30, in connection with coating, it is necessary to keep the relative positions of the bus bars 31, or the relative positions of the bus bars 31 and a mold accurately because the bus bars 31 are coated with a thin film.

Conventionally, thus the terminal 30 was manufactured in a manner such that the longitudinal center portions of the bus bars 31 were grasped between upper and lower mold parts of a mold into which resin is to be injected, and then resin is injected into the mold.

In the above-mentioned method for manufacturing the terminal 30, however, exposed portions 33 which were not coated with the coating 32 were formed because the longitudinal center portions of the bus bars 31 were fixed by the upper and lower mold parts.

Therefore, in the thus manufactured terminal 30, there was a fear that the terminal 30 or other parts were damaged or short-circuited because of the exposed portions 33 of the bus bars 31.

SUMMARY OF THE INVENTION

The present invention has been achieved in view of the foregoing problem, and it is an object thereof to provide a method for manufacturing an insert molding in which in a conductor member, that portion of a conductor member other than a contact point can be coated with a thin film surely.

In order to achieve the above object, there is provided a method for manufacturing an insert molding having a conductor member in which a part thereof is coated with resin comprising the steps of: securely supporting a part of the conductor member by a fixation member provided in a holding member; grasping the holding member supporting the conductor member by a mold so as to accommodate a portion of the conductor member where is other than a portion to be utilized as a contact point; injecting the resin into inside of the mold; and coating the conductor member accommodated in the mold integrally with the holding member by the resin.

In the method for manufacturing the thus configured insert molding, the conductor member is held by a holding member grasped in the mold. Accordingly, it is possible to held the relative positions of the conductor member and the mold when molten resin is injected into the mold. This holding member is integrated with a thin film as the molten resin injected into the mold is solidified, and there is no fear that the holding member projects out from the surface of the thin film.

That is, in this method for manufacturing insert molding, the holding member for holding the conductor member is integrated with the thin film, so that partially exposed portions conventionally formed in the conductor member can be eliminated.

Preferably, the holding member may be made from the same material as the resin, so that the appearance of insert molding is improved.

In the holding member, the fixation portion may be formed substantially into a C-shape so as to be capable of grasping the conductor member.

Here, as for the fixation portion, for example, in order to grasp a band-like conductor member, any shape will do so long as the gap size of the fixation portion set to be a little smaller than the thickness size of the conductor member so that the conductor member can be grasped by the elastic deformation of the holding member.

In the method, a convex portion may be formed in one of the conductor member and the holding member and engaged with the other member at the time of supporting.

Here, as for the convex portion, in the case where the conductor member is, for example, like a band, a protrusion may be formed by pressing the plate of the conductor member, a protrusion may be formed integrally with an end surface when the conductor member is formed by punching, or the like. Then, the protrusion may be engaged with an edge portion of the fixation portion for fixing the conductor member, may be pressed onto the inner surface of the fixation portion, or may be engaged with a concave portion provided in the inner surface of the fixation portion. On the other hand, as for the convex portion provided in the holding member, for example, a protrusion may be formed in the inner surface of the fixation portion for fixing the conductor member. Then, the protrusion may be engaged with a recess portion, a notch, a hole, or the like, formed in the conductor member.

In such a method for manufacturing insert molding, a convex portion provided in one of the conductor member and the holding member is engaged with the other. Accordingly, the relative positions of the conductor member and the holding member are kept surely.

On the other hand, the fixation portion may be formed as an insertion hole to which the conductor member is inserted. According to this configuration, the conductor member can be fixed surely regardless of the injection speed of molten resin injected into the mold.

In addition, the holding member may be formed so as to be brought into face contact with an inner wall face of the mold. According to this configuration, the holding member can be grasped firmly regardless of the injection speed of molten resin injected into the mold.

The holding member may be formed so as to be brought into line or point contact with an inner wall face of the mold. According to this configuration, it is possible to reduce the area where the holding member is exposed from the surface of the coating, so that it is possible to improve the appearance of insert moldings.

As for the conductor members, a pair of metal band portions adopted in the above-mentioned terminal may be shown by way of example. However, according to the present invention, rod or rectangular conductor members are also supposed, and the conductor members are not required to be identical in shape to each other are not required to be disposed in parallel with each other. In addition, the present invention can be applied not only to the case where two conductor members or more are coated with a thin film, but also to the case where a single conductor member is coated with a thin film.

DETAILED DESCRIPTION OF THE PREFERRED EMBODIMENTS

Figure 1A:
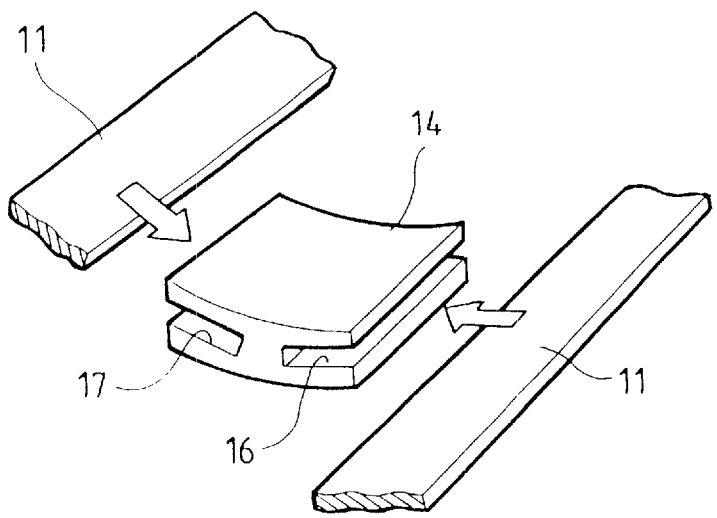
FIG. 1(A) is a partial perspective view showing an embodiment according to the present invention.

One preferred embodiment of the present invention will be described below in detail with reference to the drawings. FIG. 1(A) is a partial perspective view of a terminal 10 which is an insert molding according to the present invention, FIG. 1(B) is a partial sectional view of the same, and FIG. 1(C) is a whole plan view of the same.

Figure 1B:
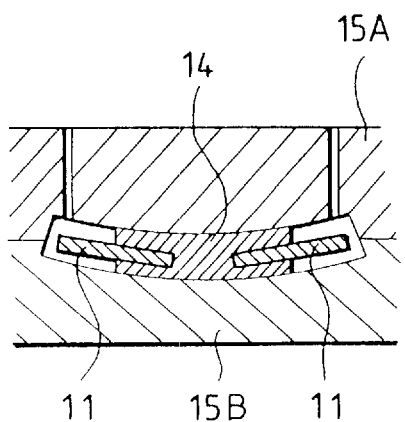
FIG. 1(B) is a partial sectional view of the same and FIG. 1(C) is a whole plan view of the same.
Figure 1C:
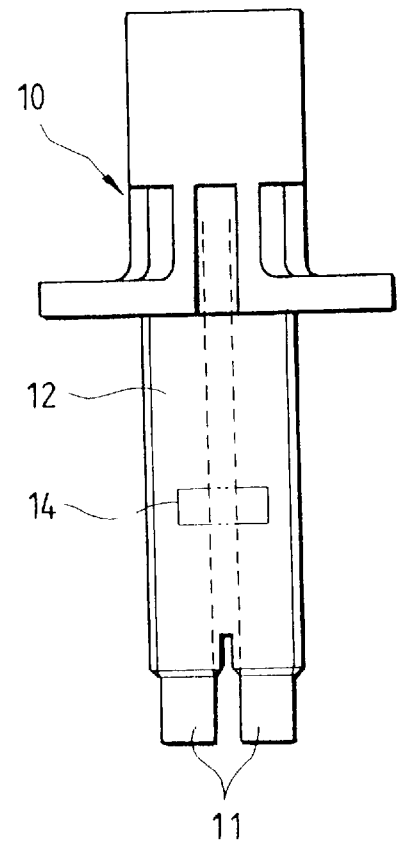

As shown in FIG. 1(C), in the terminal 10, a pair of bus bars 11 are insert-molded with resin having an insulating characteristic for connecting an electric equipment of a car. The bus bars 11 are made into suitable metal plate members having electrical conductivity, and disposed in parallel with each other along the axial direction of identical columnar circumferential surface in the state where the respective end portions of the bus bars 11 have been trued up. These bus bars 11 are projecting outside from a coating 12 in order to make the respective one end portions act as contact points respectively.

To manufacture such a terminal 10, the bus bars 11 are held by a holding member 14 (see FIG. 1(A)), and then molten resin is injected in the state where the holding member 14 is grasped between mold parts 15A and 15B (see FIG. 1(B)).

The holding member 14 is formed from resin which is the same in material and color as the molten resin, so as to have a substantially H-shaped section having a pair of fixation portions 16 and 17. The fixation portions 16 and 17 are formed into a substantially C-shape. The gap size of the C-portion is set so as to be a little smaller than the thickness of the bus bars 11, so that when the bus bars 11 are pressed into the gap, the C-portion is elastically deformed to thereby grasp the bus bars 11 therein.

The thus configured holding member 14 is formed into a curved shape so that the holding member 14 can be brought into face contact with the arcuate inner wall surface of the mold part 15A and the arcuate inner wall surface of the mold part 15B. Accordingly, the holding member 14 is firmly grasped between the mold parts 15A and 15B.

In the thus configured terminal 10, the bus bars 11 are firmly grasped by the fixation portions 16 and 17 of the holding member 14 at the time of insert molding. Therefore, the relative positions of the bus bars 11 and the holding member 14 are held surely, and this holding member 14 is grasped between the mold parts 15A and 15B. Accordingly, the relative positions of the bus bars 11 and the mold parts 15A and 15B are held surely.

Therefore, if molten resin is injected into the mold parts 15A and 15B in this state, it is possible to obtain the terminal 10 in which the bus bars 11 are coated with a thin film of the resin up to a desired thickness properly, and in which partially exposed portion cannot be formed.

As shown in FIG. 1(C), the holding member 14 is integrated with a coating 12 as the molten resin is solidified, and there is no fear that the holding member 14 projects out from the surface of the thin film 12.

The present invention is not limited to the above-mentioned embodiment, and it can be modified, reformed, etc., suitably.

For example, although the substantially H-shaped holding member which can be in face contact with the inner wall surface of the mold was shown by the way of example in the above-mentioned embodiment, the holding member according to the present invention includes such a form as shown in FIGS. 2(A) to 2(F).

Figure 2A:
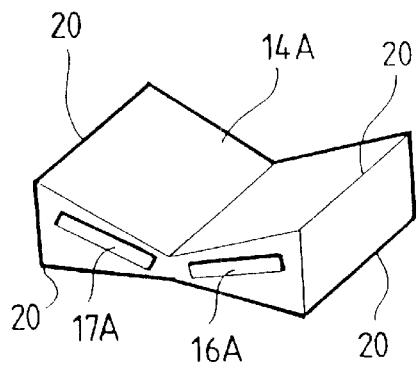
FIGS. 2(A) to 2(F) are model diagrams showing another embodiments of the present invention.
Figure 2B:
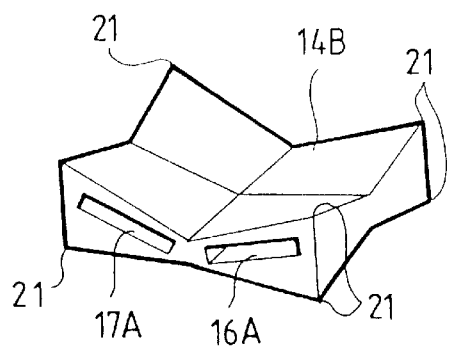
Figure 2C:
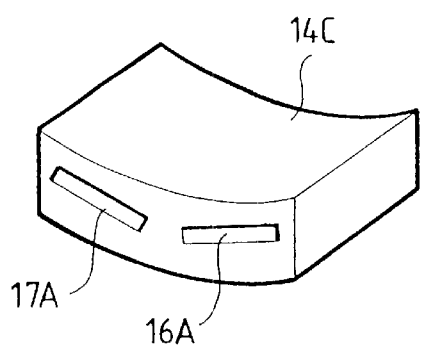

That is, in a holding member 14C shown in FIG. 2(C), fixation portions 16A and 17A are formed as through holes into which bus bars which are conductor members can be inserted. If this holding member 14C is adopted, it is further possible to obtain an effect that the bus bars can be fixed surely regardless of the injection speed of molten resin injected into the mold.

On the other hand, a peak portion 20 which can be in line contact with the inner wall surface (not-shown) of a mold is formed in a holding member 14A shown in FIG. 2(A), while a summit portion 21 which can be in point contact with the inner wall surface (not-shown) of a mold is formed in a holding member 14B shown in FIG. 2(B). If either of these holding members 14A and 14B is adopted, it is possible to obtain an effect that the area exposed in the surface of the coating can be reduced, so that the appearance of the insert molding can be improved. The fixation portions 16A and 17A are may be formed substantially into a C-shape like the embodiment shown in FIG. 1(A).

Figure 2D:
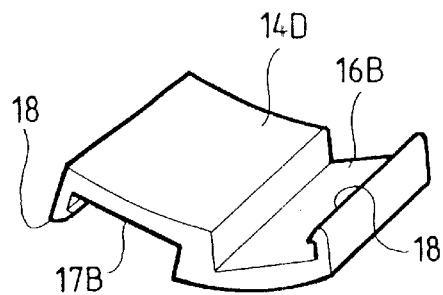

Further, a holding member 14D shown in FIG. 2(D) is formed substantially in an S-shape in which apertures of fixation portions 16B and 17B are directed oppositely to each other, and nail portions 18 are provided at the outer edge portions of the apertures of the fixation portions 16B and 17B, respectively.

On the other hand, according to the present invention, relative positioning may be performed by making a convex portion provided in one of the conductor member and the holding member engage with the other.

Figure 2E:
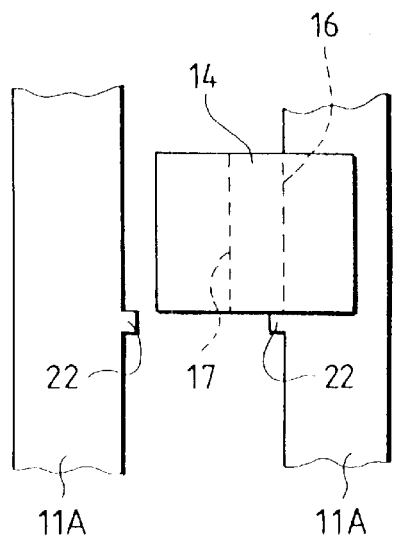

Specifically, bus bars 11A and the holding member 14 shown in FIG. 2(E) are relatively positioned by making convex portions 22 integrally formed on the end surfaces of the bus bars 11A engage with opening edge portions of the fixation portions 16 and 17.

Figure 2F:
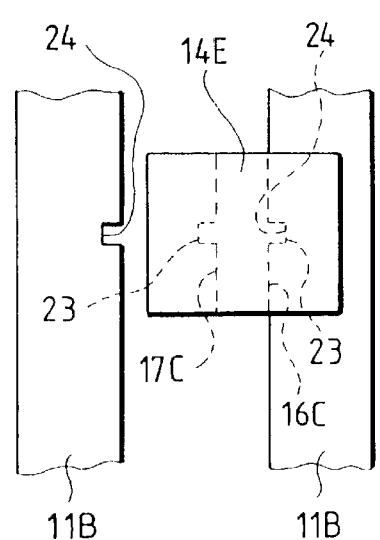
Figure 3A:
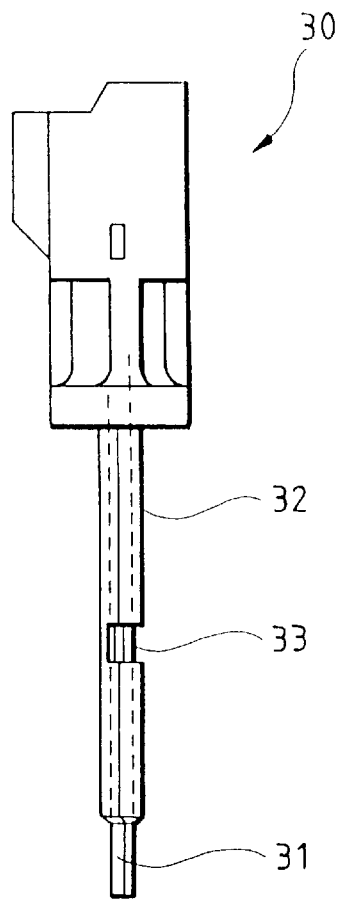
FIG. 3(A) is a sectional view showing a conventional insert molding.
Figure 3B:
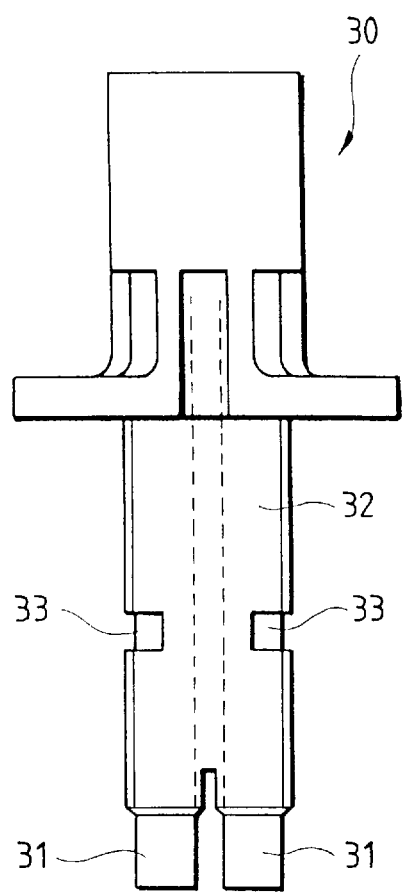
FIG. 3(B) is a plan view of the same.
Figure 3C:
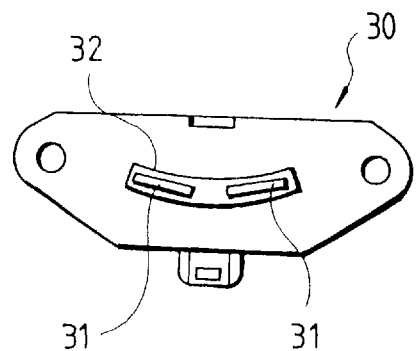
FIG. 3(C) is a rear view of the same.

Further, bus bars 11B and a holding member 14E shown in FIG. 2(F) are relatively positioned by making convex portions 23 integrally formed on the inner surfaces of fixation portions 16C and 17C engage with notches 24 formed in the end surfaces of the bus bars 11B.

Moreover, materials, shapes, sizes, forms, numbers, locations, etc. of the mold, the conductor member, the resin, the insert molding, the holding member, the fixation portions, the convex portions, and so on, shown in the above embodiment by way of example are not limited and may be modified so long as the present invention can be attained even by the modification.

As has been described heretofore, according to the present invention, the conductor member is held by the holding member grasped by the mold. Accordingly, the holding member is integrated with the thin film, so that it is possible to eliminate any partially exposed portions formed in the conductor member.

Further, according to the present invention, it is possible to improve the appearance of the insert molding if the holding member is made from the same material as resin.

In addition, according to the present invention, the fixation portions of the holding member is formed substantially in a C-shape which can grasp the conductor member. Accordingly, it is possible to perform relative fixation between the conductor member and the holding member easily.

In addition, according to the present invention, it can be configured that the fixation portion is formed as the insertion holes to which the conductor members are inserted. Accordingly, the conductor members can be fixed surely regardless of the injection speed of molten resin injected into the mold.

Further, according to the present invention, it can be configured that the holding member is in line contact with the inner wall surface of the mold, or that the holding member is in point contact with the inner wall surface of the mold. Accordingly, it is possible to reduce the area of exposure of the holding member in the surface of coating, so that it is possible to improve the appearance of the insert molding.

In addition, according to the present invention, it can be configured that the convex portion provided in one of the conductor member and the holding member engaged with the other. Accordingly, it is possible to keep the relative positions of the conductor members and the holding member surely.

What is claimed is:

1. An insert molding comprising:

a conductor member in which an end portion thereof is utilized as a contact point;

a fixation member for holding a portion of the conductor member; and a resin portion for covering the conductor member in areas other than the contact point with the fixation member formed integrally with the resin portion.

2. The insert molding as set forth in claim 1, wherein the fixation member is comprising of a material identical to the resin.

3. The insert molding as set forth in claim 1, wherein the fixation member is formed substantially into a C-shape for receiving the conductor member.

4. The insert molding as set forth in claim 3, wherein a convex portion is formed in one of the conductor member and the fixation member for engaging with the other member at the time of supporting.

5. The insert molding as set forth in claim 1, wherein the fixation portion is formed as an insertion hole to which the conductor member is inserted.

* * * * *